United States Patent
Shenoy et al.

(10) Patent No.: US 12,124,589 B2
(45) Date of Patent: Oct. 22, 2024

(54) ANTICIPATORY CYBERSECURITY

(71) Applicant: SAIX INC., Ashburn, VA (US)

(72) Inventors: Hemanth Shenoy, Karnataka (IN); Vardaan Sharma, Telangana (IN); Phanindra Banda, Telangana (IN)

(73) Assignee: SAIX INC., Ashburn, VA (US)

( * ) Notice: Subject to any disclaimer, the term of this patent is extended or adjusted under 35 U.S.C. 154(b) by 291 days.

(21) Appl. No.: 17/704,342

(22) Filed: Mar. 25, 2022

(65) Prior Publication Data
US 2022/0309166 A1    Sep. 29, 2022

Related U.S. Application Data

(60) Provisional application No. 63/166,574, filed on Mar. 26, 2021.

(51) Int. Cl.
*G06F 21/00*    (2013.01)
*G06F 21/57*    (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | | |
|---|---|---|---|---|
| 11,003,773 | B1* | 5/2021 | Fang | H04L 63/0263 |
| 11,258,806 | B1* | 2/2022 | Berninger | H04L 63/1416 |
| 2020/0167705 | A1* | 5/2020 | Risoldi | G06Q 10/0635 |
| 2021/0406368 | A1* | 12/2021 | Agranonik | G06N 3/08 |

* cited by examiner

*Primary Examiner* — Ghazal B Shehni
(74) *Attorney, Agent, or Firm* — MH2 Technology Law Group, LLP

(57) ABSTRACT

A cybersecurity system for an information and technology system is presented. The cybersecurity system includes: a risk engine that detects past events in the information and technology system, the risk engine including an electronically stored set of rules characterizing events; a prevention engine that models events in the information and technology system, the prevention engine including a model builder, the prevention engine communicatively coupled to the risk engine; and a user interface communicatively coupled to the risk engine and to the prevention engine; where the model builder is configured to build at least one attack tree based on a past event detected by the risk engine and a potential event modeled by the prevention engine, and where the cybersecurity system is configured to report the at least one attack tree through the user interface, such that a future event depicted in the at least one attack tree can be remediated.

18 Claims, 5 Drawing Sheets

ANTICIPATORY CYBERSECURITY

FIELD

This disclosure relates generally to cybersecurity.

BACKGROUND

All organizations are vulnerable to unpredictable cyber risks ranging from hacking to malware attacks and leading to data breaches. Perimeter-based risks that used to be rampant are on the wane. However, the newest and most prevalent perimeter for cyber-attacks attacks leverage identity and underlying access.

Cyberattack prevention is complicated in a complex hybrid information technology environment with identities of employees, systems, things, and customers, and a constant need to make everything easy to use. Known cybersecurity techniques typically resort to identifying attacks in progress by watching for anomalies or matching signatures. Today's evolving, sophisticated and relentless cyberattacks render these types of systems insufficient.

SUMMARY

According to various embodiments, a cybersecurity system for an information and technology system is disclosed. The cybersecurity system includes: a risk engine that detects past events in the information and technology system, the risk engine including an electronically stored set of rules characterizing events; a prevention engine that models events in the information and technology system, the prevention engine including a model builder, the prevention engine communicatively coupled to the risk engine; and a user interface communicatively coupled to the risk engine and to the prevention engine; where the model builder is configured to build at least one attack tree based on a past event detected by the risk engine and a potential event modeled by the prevention engine, and where the cybersecurity system is configured to report the at least one attack tree through the user interface, such that a future event depicted in the at least one attack tree can be remediated.

Various optional features of the above embodiments include the following. The model builder may be communicatively coupled to a store of data characterizing the information and technology system and to a knowledge base of tactics, techniques, and procedures (TTPs), each TTP including a respective identification of an input event and a respective identification of an output event, and the prevention engine may include: a master communicatively coupled to, and in control of, each of a plurality of agents, each agent controlling an entity of the information and technology system, and a model runner communicatively coupled to the to the master, the model runner configured to direct actions of the master based on data from the model builder, where the model builder is configured to build the at least one attack tree based on a past event detected by the risk engine and a potential event modeled by the prevention engine using the knowledge base, the master, and the model runner. The knowledge base of TTPs may include TTPs constructed from natural language processing of incident reports. The model builder may be configured to build the at least one attack tree based on a past event detected by the risk engine and a potential event modeled by the prevention engine by: receiving an identification of the past event from the risk engine; identifying a first TTP in the knowledge base that has a respective input event identification matching the identification of the past event; and determining a respective output event identification of the first TTP. The model builder may be further configured to build the at least one attack tree based on a past event detected by the risk engine and a potential event modeled by the prevention engine by: identifying a second TTP in the knowledge base that has a respective input event identification matching the respective output event identification of first TTP; and determining a respective output event identification of the second TTP. The at least one the attack tree may include: a first node representing the past event; a second node representing the respective output event of the first TTP; a third node representing the respective output event of the second TTP; a first link between the first node and the second node representing the first TTP; and a second link between the second node and the third node representing the second TTP. The prevention engine may be further configured to execute the first TTP and the second TTP in the information and technology system. The user interface may be configured to accept a user input specifying a limitation on executions of TTPs in the information and technology system by the prevention engine. The cybersecurity system may further include a remediation engine that provides a remediation option for preventing the future event depicted in the at least one attack tree from occurring, where the remediation engine is communicatively coupled to at least one of a target application, the information and technology system, or a control plane. The model builder may be configured to build a plurality of attack trees based on past events detected by the risk engine and potential events modeled by the prevention engine, and the cybersecurity system may be configured to rank the plurality of attack trees and report the ranked plurality of attack trees through the user interface.

According to various embodiments, a non-transitory computer readable medium including instructions that, when executed by an electronic processor, configure the electronic processor as a cybersecurity system for an information and technology system, is disclosed. The cybersecurity system includes: a risk engine that detects past events in the information and technology system, the risk engine including an electronically stored set of rules characterizing events; a prevention engine that models events in the information and technology system, the prevention engine including a model builder, the prevention engine communicatively coupled to the risk engine; and a user interface communicatively coupled to the risk engine and to the prevention engine. The instructions configure the model builder to build at least one attack tree based on a past event detected by the risk engine and a potential event modeled by the prevention engine. The instructions configure the cybersecurity system to report the at least one attack tree through the user interface, such that a future event depicted in the at least one attack tree can be remediated.

Various optional features of the above embodiments include the following. The model builder may be communicatively coupled to a store of data characterizing the information and technology system and to a knowledge base of tactics, techniques, and procedures (TTPs), each TTP including a respective identification of an input event and a respective identification of an output event, and the prevention engine may include: a master communicatively coupled to, and in control of, each of a plurality of agents, each agent controlling an entity of the information and technology system, and a model runner communicatively coupled to the to the master, where the instructions configure the model runner to direct actions of the master based on data from the model builder, where the instructions configure the model builder to build the at least one attack tree based on a past event detected by the risk engine and a potential event modeled by the prevention engine using the knowledge base, the master, and the model runner. The knowledge base of TTPs may include TTPs constructed from natural language processing of incident reports. The instructions may configure the model builder to build the at least one attack tree based on a past event detected by the risk engine and a potential event modeled by the prevention engine by: receiving an identification of the past event from the risk engine; identifying a first TTP in the knowledge base that has a respective input event identification matching the identification of the past event; and determining a respective output event identification of the first TTP. The instructions may further configure the model builder to build the at least one attack tree based on a past event detected by the risk engine and a potential event modeled by the prevention engine by: identifying a second TTP in the knowledge base that has a respective input event identification matching the respective output event identification of first TTP; and determining a respective output event identification of the second TTP. The at least one the attack tree may include: a first node representing the past event; a second node representing the respective output event of the first TTP; a third node representing the respective output event of the second TTP; a first link between the first node and the second node representing the first TTP; and a second link between the second node and the third node representing the second TTP. The instructions may further configure the prevention engine to execute the first TTP and the second TTP in the information and technology system. The instructions may configure the user interface to accept a user input specifying a limitation on executions of TTPs in the information and technology system by the prevention engine. The cybersecurity system may further include a remediation engine that provides a remediation option for preventing the future event depicted in the at least one attack tree from occurring, where the remediation engine is communicatively coupled to at least one of a target application, the information and technology system, or a control plane. The instructions may configure the model builder to build a plurality of attack trees based on past events detected by the risk engine and potential events modeled by the prevention engine, and the instructions may configure the cybersecurity system to rank the plurality of attack trees and report the ranked plurality of attack trees through the user interface.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments combat current threats that exploit identity based perimeter attacks. Some embodiments prevent and safeguard from any cybersecurity threat, both simple and sophisticated. Some embodiments provide continuous and near real-time monitoring. Some embodiments detect vulnerabilities and provide rapid automated remediation before they get exploited. That is, some embodiments detect and prevent cyberattacks in an information technology system. Such embodiments are superior to prior art techniques that detect and remediate cyberattacks only after they have been exploited.

Some embodiments "stay a step ahead" by proactively detecting vulnerabilities before an attack occurs. Some embodiments learn what would happen if an adversary performed particular actions by modeling them, e.g., executing them in the protected system using safeguards, or simulating them in a controlled environment. If the action produces an "undesirable outcome," also referred to as a "bad outcome," akin to an actual attack, then some embodiments recommend and/or implement remediation measures. Thus, some embodiments automatically execute the actions at a very granular and context-driven level. Some embodiments systematically explore an attack surface using anticipatory vulnerability exploitation.

Figure 1:
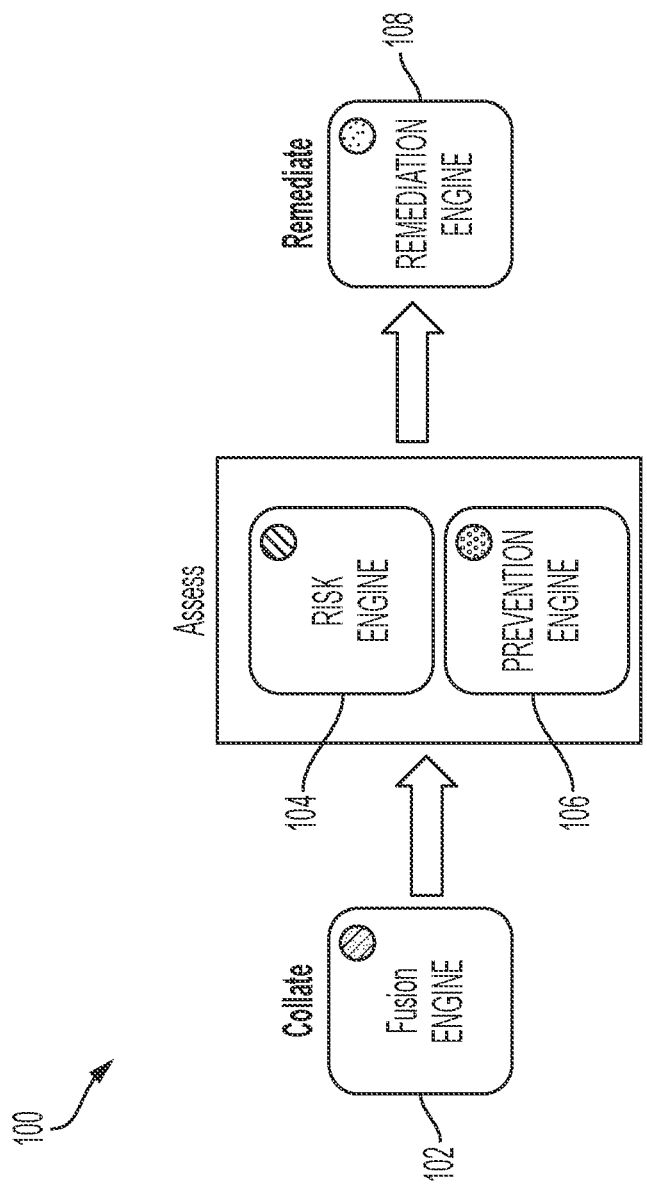
FIG. 1 is a schematic diagram of the main components of a cybersecurity system according to various embodiments.

FIG. 1 is a schematic diagram of the main components of a cybersecurity system 100 according to various embodiments. System 100 may be deployed relative to an information technology system, such as an enterprise system, to provide anticipatory cybersecurity protection. As shown in FIG. 1, system 100 includes a collate portion, including fusion engine 102, an assess portion, including risk engine 104 and prevention engine 106, and a remediation portion, including remediation engine 108. According to some embodiments, at least an assess portion, including risk engine 104 and prevention engine 106, is provided, and existing enterprise collation and/or remediation portions may be provided by the enterprise. For example, the collation portion may be provided as disclosed in U.S. Pat. No. 11,157,629, which is hereby incorporated by reference in its entirety. As another example, the remediation portion may include an existing Security Orchestration, Automation and Response (SOAR) component. Nevertheless, embodiments that include a fusion engine 102 in the collate portion and a remediation engine 108 in the remediation portion, as disclosed herein, offer advantages, as further disclosed herein.

The collate portion, including fusion engine 102, acquires cyberattack information from multiple sources and processes and formats it to provide a knowledge base that is used by other system components. A detailed description of an example collate portion, including a fusion engine such as fusion 102, is shown and described in detail herein in reference to FIG. 2.

The access portion includes risk engine 104. Risk engine 104 determines events that have already occurred in the protected information and technology system. Such events are then used by prevention engine 106 to model future events. In general, risk engine 104 serves to ascertain the risk of a threat exploiting vulnerabilities. Risk engine 104 is thus communicatively coupled to a knowledge base of rules (e.g., signatures) that identify risk when satisfied. An example such rule is "former employee with active account."

Risk may be calculated by change in entities. Entities according to various embodiments may include identity, application/system, account, and entitlement. These entities have attributes that describe their state. For example, an identity entity's prime attributes can include a location-based status, a time-based status, an employment status, a behavior status, a relationship status between the identity and the secured system, a role of the identity within the organization of the secured system, a type of employment of the identity within the organization, an employment or end date of the identity in the organization, etc. An identity's profile attributes can include a personal identification, a name, an account identification, a registration of a particular application for the identity, an entitlement identifier for the identity, etc. Account entity attributes can include an account ID, an active risk score, a historic risk score, a last up timestamp, a last login timestamp, a password, a failed login count, etc. Attributes for application and entitlement entities are also contemplated, e.g., as disclosed in detail in U.S. Pat. No. 11,157,629, which is incorporated by reference in its entirety.

Risk can be derived based on an entity's state or dynamic events. For example, consider an enterprise in one country that has a global presence, and impending geopolitical nation differences will impact an identity entity's risk as its geolocation. As another example, dynamic risk includes when a change in an entity's state from one to another is signified by actions. These risks, both static and dynamic in nature, can constitute an overall risk. Risk can be calculated by "known known" controls described and defined by subject matter experts and "known unknown" controls derived that are derived according to various embodiments.

"Known known" controls can include rules to enforce controls. An example rule can include "active account of a terminated user." Because activity of an employee who has left the firm is an undesirable outcome, a simple rule or signature can represent such a risk. Rules may be written by a subject matter expert. Such rules may help build prevention techniques. For example, a single-sign-on policy can block a particular country. Users from the blocked country are then denied access. Enterprises can add to a rules library to reflect their respective policies.

"Known unknown" controls can include correlation, clustering, and time series patterns. For example, an event of data collected over a period of time can be experienced in the enterprise. This data may be mined and models may be applied. This ensures that the controls the subject matter missed may be found. For example, "user brute forcing into an application" indicates a pattern of behavior that emerges from historical data. Other more subtle risks that may emerge from historical data include "evidence of collusion," "pattern of exfiltration," "seasonality," etc.

The access portion of system 100 also includes prevention engine 106. In general, prevention engine 106 serves to model attacks on the information and technology system based on events that have occurred and events that can occur. Prevention engine 106 can operate based on "unknown unknown" controls.

Unknown unknown controls help build an enterprise's defense against threats that have not occurred. One technique to solve this problem is research and participation in research communities that share intel. However, reliance on such data alone may be insufficient. Thus, some embodiments consume and extrapolate such research output. Some embodiments incorporate a systematic approach that can find all prevention methods that do not lead to bad outcomes. A bad outcome in a health care company may be completely different from that of a financial company, as the crown jewels in these enterprises are very different. Even within a single vertical such as health care, enterprises may have very different approaches to protecting their data. Similarly, federal or state governments have different ways to protect their citizens' information. Given that every enterprise is different, exploring, seeking, and finding the path and preventing them for each bad outcome is a vast space. To explore this space, prevention engine 106 finds the path to the bad outcome and bubbles the best remediations to the top to prevent the bad outcome.

Some embodiments thus define bad outcomes and then find ways to exploit every vulnerability systematically. If there is more than one way to exploit a vulnerability, then a list of each path of it occurring may be used. All the paths to the bad outcome are then presented. Thus, according to some embodiments, prevention engine 106 acts as an attacker. This allows an enterprise to prevent what may occur rather than remediate what has already occurred. For example, a terminated user with an active account can produce many bad outcomes. Prevention engine 106 defines one or more paths that can result in such bad outcomes. System 100 then helps prevent the bad outcome from occurring. In this example, a user can get access to a sensitive file on a system by becoming a member of a group or by changing the file permissions According to some embodiments, system 100 detects and stops these actions that can lead to the bad outcome example of file exfiltration.

Thus, according to some embodiments, prevention engine 106 informs agents installed in the information and technology system and the library of bad outcomes to explore the vulnerabilities and prevention space. While the agents get to work to find vulnerabilities, the same library may be used to remediate current issues. This can allow prevention engine 106 to start immediately rather than requiring bootstrap time.

Figure 3:
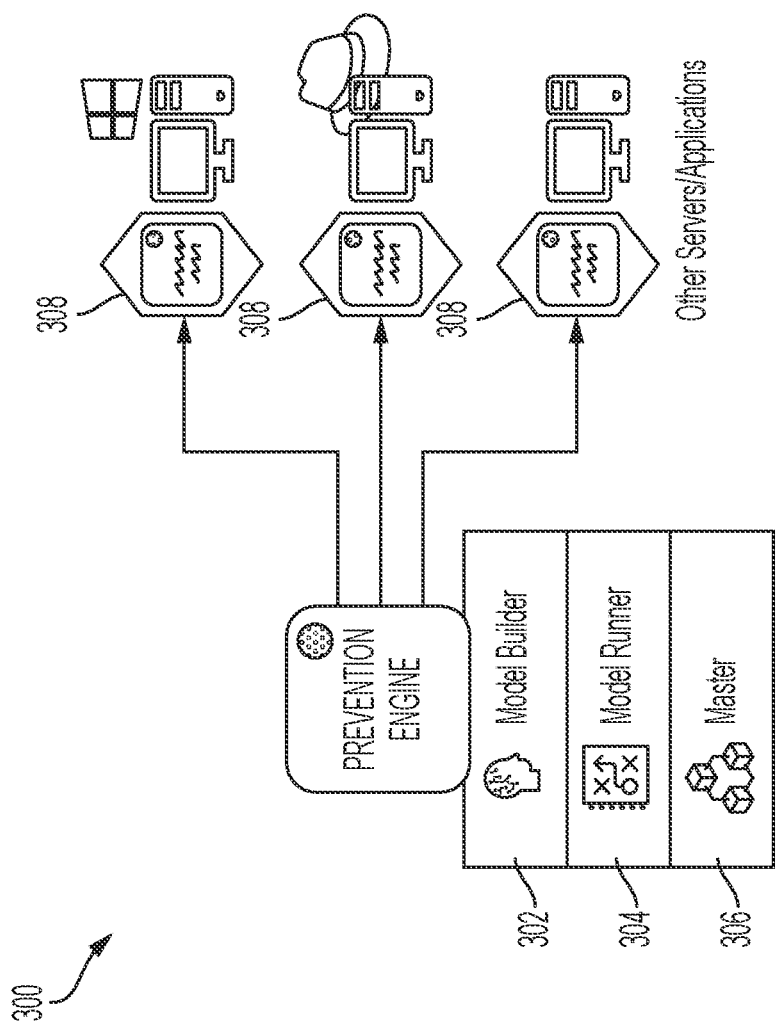
FIG. 3 is a schematic diagram of a prevention engine of a cybersecurity system according to various embodiments.

Prevention engine 106 is further shown and described in reference to FIG. 3.

System 100 also includes remediation engine 108. In general, remediation engine 108 presents identified vulnerabilities to a user, through a user interface, and the user can select from various options as to how such vulnerabilities can be remediated. According to some embodiments, remediations engine 108 implements the remediation options automatically and autonomously.

Thus, remediation engine 108 can integrate the results of risk engine 104 and prevention engine 106 with a control plane that can include, by way of non-limiting examples, any, or any combination, of single sign-on, multi-factor authentication, privilege access management, identity and access governance, data loss prevention, firewall, endpoint detection and response and/or extended detection and response. Consider the bad outcome "nonconformance to least privilege." One way to arrive at this bad outcome would be to have a dormant user account. Remediation engine 108 can revoke such a user account. For example, remediation engine 108 can send the revocation information to an Identity and Access Governance (IAG) system that deprovisions the user account. Remediation engine 108 can also revoke the user account directly if the IAG system is not connected to the target system that contains the unused account. For example, according to various embodiments, remediation engine 108 works with old and new identity and access management control planes. Newer control plane may have just in time capabilities. In this case, remediation engine 108 may feed intelligence signals from one cyber security domain such as authentication to another such as authorization. For example, a user may attempt to brute force into a mainframe system. The same user may attempt to access a cloud property using cloud privileged access management and/or just in time access. Remediation engine 108 can receive data representing the user's attempts to brute force into a mainframe from the access portion and pass the same to the access management system. The access management system can then block the user account and/or suspend the user session and force the user to login with multi-factor authentication.

Figure 5:
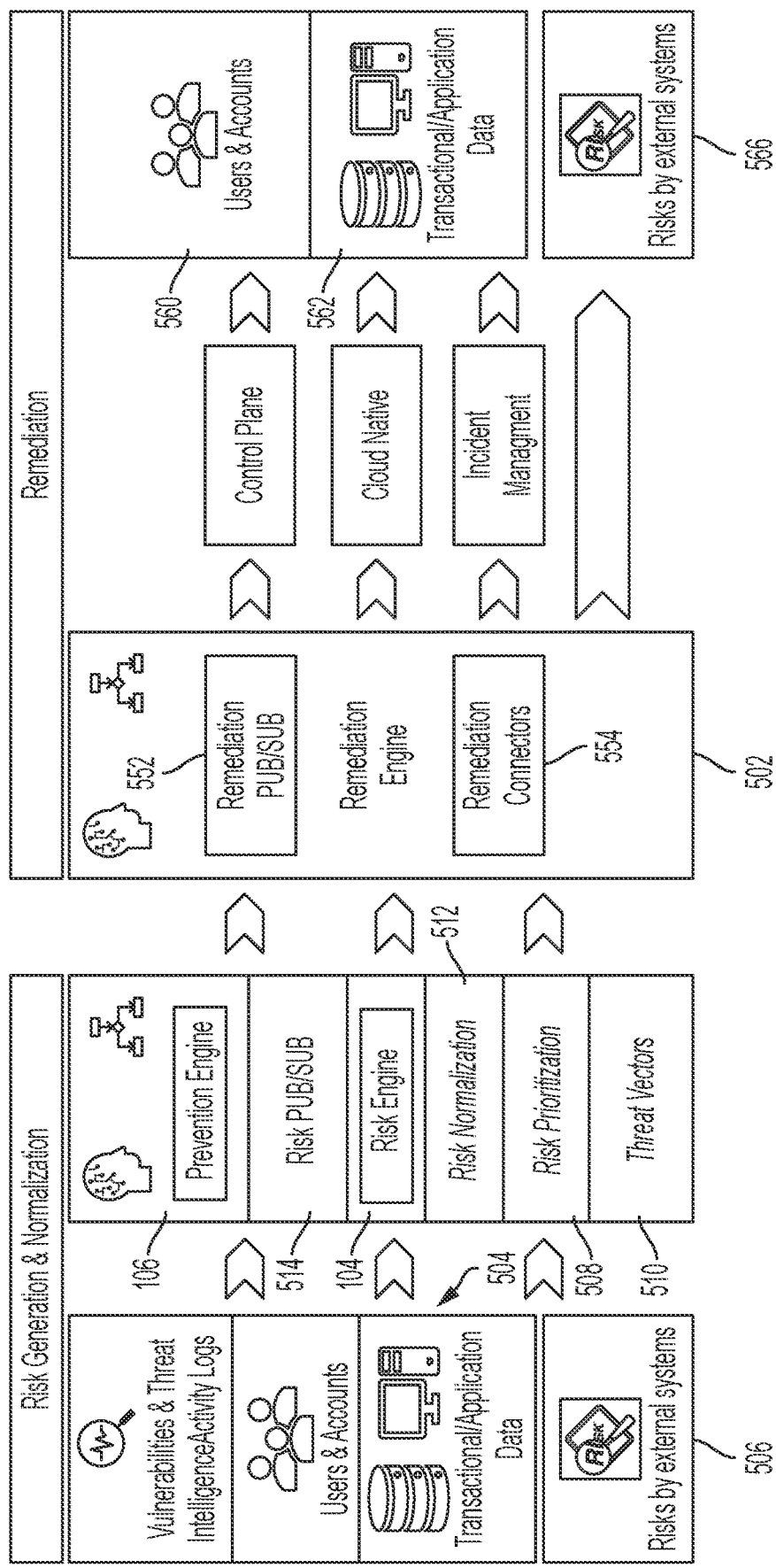
FIG. 5 is schematic diagram focusing on remediation by a cybersecurity system according to various embodiments.

Remediation engine 108 is further shown and described in reference to FIG. 5.

Figure 2:
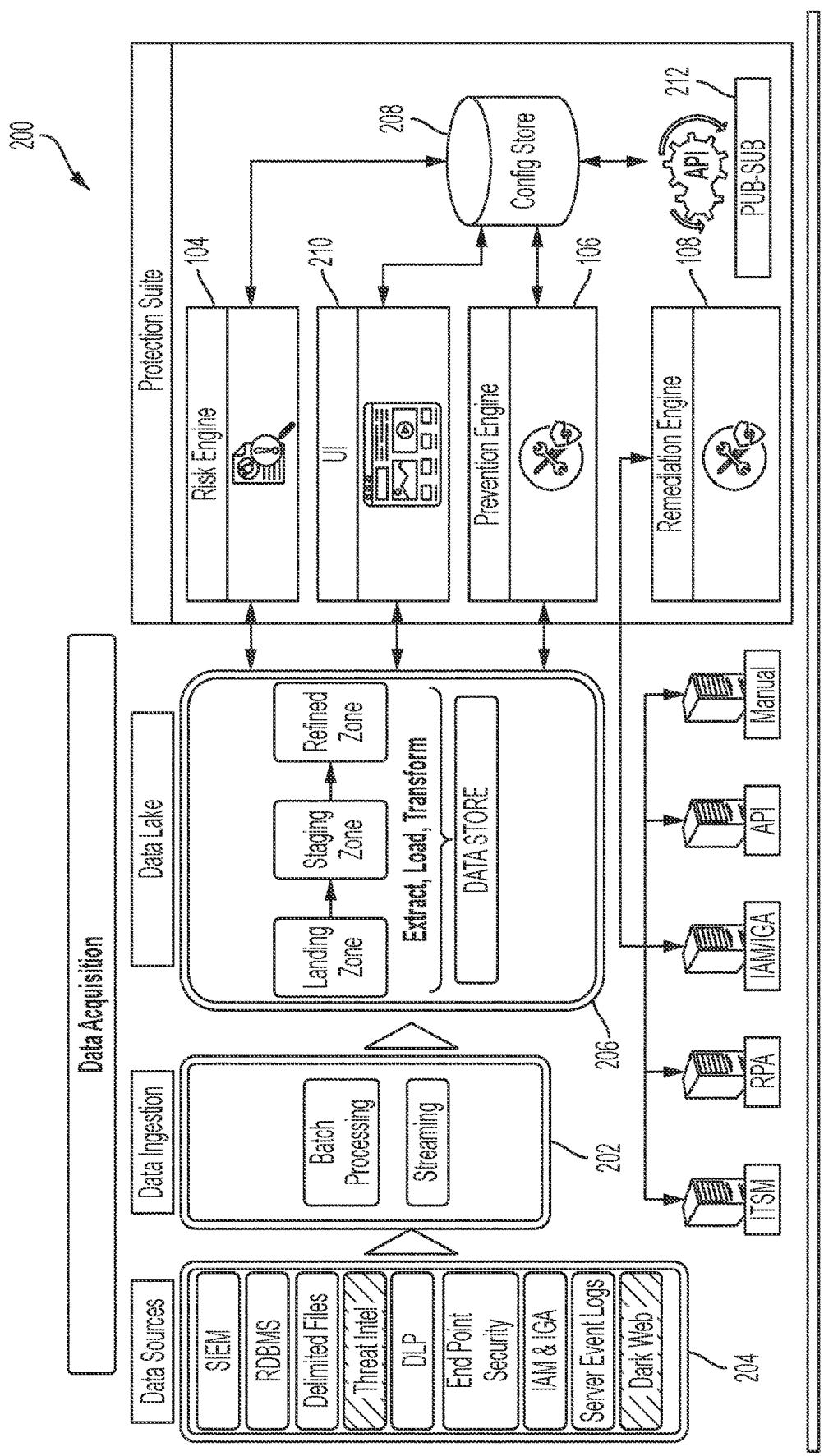
FIG. 2 is a schematic diagram focusing on data acquisition of a cybersecurity system according to various embodiments.

FIG. 2 is a schematic diagram focusing on data acquisition portion of a cybersecurity system 200 according to various embodiments. As shown in FIG. 2, data ingestion module 202, which may include a fusion engine such as fusion engine 102 of FIG. 1, acquires threat data from a variety of data sources 204. Such sources include any, or any combination, of: security information and event management (SIEM) sources, relational database management systems (RDBMS) sources, delimited file sources, threat intelligence sources, data loss prevention (DLP) sources, end point security sources, identity and access management (IAM) and identity and government access (IGA) sources, server event log sources, and/or the dark web. Data ingestion module 202 retrieves threat data from these sources using batch processing and/or streaming techniques. Data ingestion module 202 may receive periodic updates from respective authoritative sources in a push fashion to keep the information up to date, and/or may pull such data. Data ingestion module 202 processes retrieved data for storage in data lake 206.

Data lake 206, which may include an electronic database, receives data from data ingestion module 204 and formats it for consumption by a risk engine, such as risk engine 104 and/or a prevention engine, such as prevention engine 106. For example, data lake 206 may format the ingested data into data structures representing individual tactics, techniques, and procedures (TTP). Each TTP may represent an attack. Each TTP may include a respective identification of one or more input events and a respective identification of one or more output events. The input event identification represents event(s) that the TTP uses to perform its attack, and the output event identification represents event(s) that the TTP produces.

For example, a TTP may have as an input identification a description of a compromised internet-connected workstation and have as an output identification a description of a registry settings modification operation to allow for privilege escalation. The attack of such a TTP may include utilization of the compromised workstation to escalate privilege. As another example, a TTP may have as an input identification a description of a registry settings modification operation to allow for privilege escalation and have as an output identification a description of backup system set to have a default administrative account. The attack of such a TTP may include utilization of the escalated privilege to set up a default administrative account.

Data lake 206 may store the TTPs in a knowledge base for consumption by any of risk engine 104, prevention engine 106, and/or remediation engine 108.

According to some embodiments, data lake 206 includes natural language processing that extracts input identifications and/or output identifications for TTPs from any of data sources 204. Such natural language processing can thus enrich and supplement existing sources of TTPs. For example, natural language processing can be used to process a description in a dark web hacker forum to extract an input identification, an output identification, and an attack from a discursive hacker post, to generate a TTP from scratch. As another example, natural language processing can be used to extract any, or any combination, of an input identification, an output identification, and an attack from a discursive bug report on a vendor's online forum to supplement an existing TTP with additional information. As another example, natural language processing can be used to extract information about TTPs that are frequently used together from any source, thus supplementing expert chaining information for use by a model builder, e.g., as disclosed herein in reference to FIG. 3.

As shown in FIG. 2, data lake 206 is communicatively coupled to risk engine 104, prevention engine 106, and remediation engine 108, each of which are communicatively coupled to a configuration store 208. Configuration store 208 can store various data produced by embodiments, by way of non-limiting example, attack trees, as shown and described herein in reference to FIG. 4. Configuration store may store 208 may store configuration information about the information technology system being protected, including all entity information, its network topology including all connections, its architecture, etc. Configuration store 208 is further communicatively coupled to a publish/subscribe implementation 212, such as is described in detail in reference to FIG. 5.

Data lake 206 is further communicatively coupled to user interface 210. In general, user interface 210 may allow a user to set various system parameters and view various system outputs, as described throughout this disclosure. According to some embodiments, user interface 206 allows the enterprise to be able to view its risk posture at any given time. According to some embodiments, the view is democratized so an executive and a system owner may benefit from views directed specifically for them. According to some embodiments, the visualization permits visual verification that the silent prevention methods are continuously working, thereby holding risk value down to an acceptable level. Further, according to some embodiments, user interface 206 permits specialized views. For example, according to some embodiments, user interface 206 permits views of vendor and/or third party risk. This is advantageous because an enterprise need not increase its technical debt by procuring more tools for a subset of the same risk views.

FIG. 3 is a schematic diagram of a prevention engine 300 of a cybersecurity system according to various embodiments. Prevention engine 300 includes model builder 302, model runner 304, and master 306.

Figure 4:
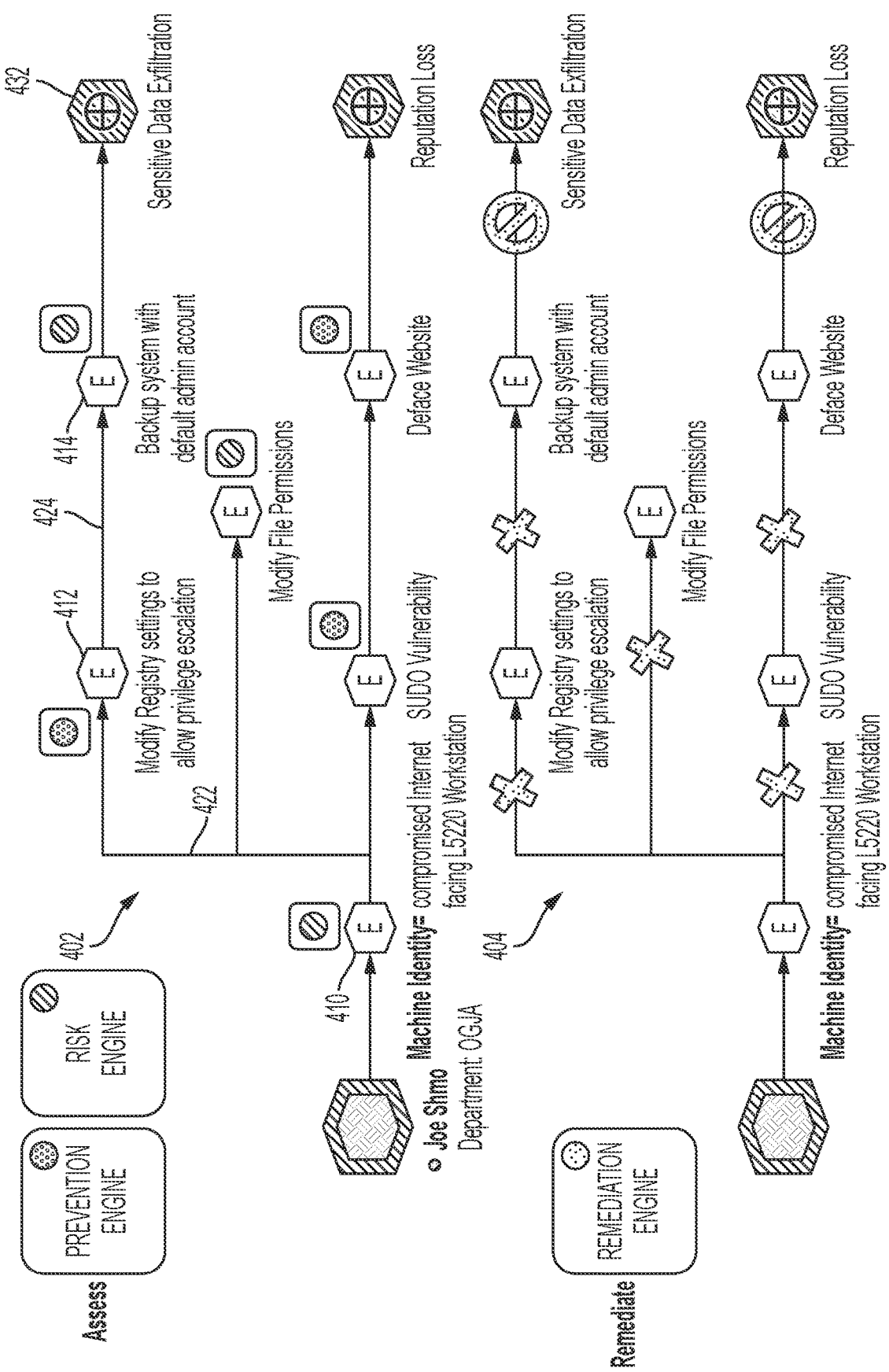
FIG. 4 depicts attack trees constructed by, and used for remediation, by a cybersecurity system according to various embodiments.

In general, model builder 302 generates attack trees, such as are shown and descried herein in reference to FIG. 4. Model builder 302 thus is communicatively coupled to the knowledge base of TTPs, e.g., as shown and described herein in reference to FIG. 2. Model builder 302 may build attack trees by modeling events in the protected information technology system. Such modeling may include simulating events in the protected information technology system, e.g., by executing events in one or more virtual machines that simulate the protected system. That is, model builder 302 may build attack trees by simulating execution of events in the protected system. Alternately, or in addition, model builder 302 may build attack trees by executing events in the actual protected systems. That is, model builder 302 may model events in the protected system by executing events in the protected system. Model builder 302 may stop short of producing an undesirable outcome in the protected system.

Model builder 302 builds attack trees based on events that have already occurred, as reported by a risk engine, such as risk engine 104 as shown and described herein in reference to FIG. 1, and based on TTPs as obtained from its knowledge base. Further, master builder 302 builds attack trees recursively, based on events that it models. One or more such events may correspond to an input identification a TTP, as obtained from the knowledge base. The output identification of such a TTP corresponds to another event, which model builder 302 may use as an input to another TTP. Thus, model builder 302 constructs attack trees by stringing together events using TTPs, where the events include events that have already occurred, as well as events that are modeled in the protected system by model builder 302. In this manner, model builder 302 recursively constructs attack trees.

Model builder 302 may identify TTPs in the knowledge base that are relevant to the protected system using any of a variety of techniques. According to some embodiments, model builder 302 keeps a running record of events that have already occurred and events that are modeled in the protected system. Model builder 302 searches the knowledge base for TTPs that have input identifications corresponding to any such event or events. Model builder 302 may restrict such a search to TTPs that correspond to architecture, topology, resources, and other features of the protected system. Model builder 302 may utilize expert chaining, searching first TTPs that have, in the past, been most frequently linked together. Thus, model builder 302 determines what events are possible within the protected system based on events that have occurred in the protected system and events that are modeled in the protected system using the knowledge base of TTPs.

Prevention engine 300 also includes master 306. In general, master 306 serves as in interface between the cybersecurity system and the protected information technology system. The protected system may have a plurality of agents 308 installed, e.g., an agent for an operating system, such as a WINDOWS operating system, an agent for open source software products, such as RED HAT software products, an agent for hardware, such as servers, workstations, network storage, etc., and an agent for any other resource or entity on the protected system. Agents 308 are communicatively coupled to master 306, e.g., at least partially through the network of the protected system. Master 306 can perform operations within the resources or entities of the protected network by directing a corresponding agent to perform a corresponding action. When instructed by model runner 304 (described below), master directs execution of events to the specific appropriate resource or entity in the protected system that can execute the event. In this way, master 306 can execute events in the protected system, as described herein, so as to model events in the protected system.

Prevention engine 300 also includes model runner 304. Model runner 304 is communicatively coupled to model builder 302 and master 306. In general, model runner 304 receives models, e.g., attack trees, from model builder 302, and directs master 306 to perform corresponding action in the protected system. accordingly, model runner 304 can parse attack trees, extract event information, and direct master 306 to execute corresponding actions in the protected system to model events by execution. In modeling events, model runner 304 decides next actions in accordance with the provided attack tree(s). Model runner 304 can select from among various available next actions, in accordance with the provided attack tree(s), according to a variety of criteria. According to some embodiments, model runner 304 selects a next action that progresses the path to the bad outcome. According to some embodiments, model runner 304 selects a next action according to the eventual bad outcome, e.g., model runner 304 selects a next event that will lead to the bad outcome at some point further along is a provided attack tree. According to some embodiments, model runner 304 selects a next action according to newness of the corresponding TTP. For example, newer TTPs are less likely to be remediated. Any, or any combination, of the disclosed selection criteria may be used, as well as other selection criteria.

Prevention engine 300 may stop short of executing actions in the protected system that would cause actual bad outcomes. For example, event identifications in the TTPs of the knowledge base may be ranked according to severity. Events that meet or exceed a specified limit may not be executed in the protected system (but may be modeled in a simulated system). The specified limit may be set by a user according to various embodiments. As another example, a user may specify that a certain event may not be executed, and may also specify a limit on events that precede the certain event. That is, a user may specify that a certain event may not be executed, and further that no event that precedes the certain event in an attack tree may be executed.

FIG. 4 depicts an attack tree 402 constructed, and an attack tree 404 used for remediation, by a cybersecurity system according to various embodiments. Attack trees 402, 404 may be constructed by a model builder, such as model builder 304 as shown and described herein in reference to FIG. 3. Each node in attack trees 402, 404 represents an event. Each link (i.e., edge or branch) in attack trees 402, 404 represents a TTP. Each node in attack trees 402, 404 represents an event. Events are joined by the directed links according to input identifications and output identifications of the corresponding TTP. That is, a TTP edge originates from an event that corresponds to the input identification of the TTP and terminates at an event that corresponds to the output identification of the TTP.

For example, edge 422 represents a TTP that has as an input identification an event that includes a compromised internet-connected workstation, which corresponds to node 410, and has as an output identification a description of an event that includes a registry settings modification operation to allow for privilege escalation, which corresponds to node 412. As another example, edge 424 represents a TTP that has as an input identification a description of an event that includes a registry settings modification operation to allow for privilege escalation, which corresponds to node 412, and has as an output identification a description of an event that includes a backup system set to have a default administrative account, which corresponds to node 414.

Trees 402, 404 may be identity-based, e.g., having an identity as a root node. As shown in FIG. 4, the root nodes of trees 402, 404 correspond to a user named "Joe Shmo."

Trees 402, 404 may include leaf nodes that represent adverse events, that is, "bad" events. For example, node 432 represents the bad outcome or adverse event of sensitive data exfiltration from the protected information technology system.

Tree 404 depicts example remediation loci, as marked with the symbol "X". As shown and described further in reference to FIG. 5, remediation according to various embodiments may include preventing execution of TTPs represented by any edge so marked. For example, preventing privilege escalation, represented by edge 422, and/or preventing a default administrator account from being created, as represented by node 414, can remediate the adverse outcome of data exfiltration, as represented by node 432.

FIG. 5 is schematic diagram focusing on remediation by a cybersecurity system 500 according to various embodiments. Cybersecurity system 500 includes a risk generation and normalization portion on the left and a remediation portion on the right.

The risk generation and normalization portion includes data storage 506, which may be implemented in part or whole as the data lake 206 as shown and described in reference to FIG. 2. Data store 506 includes vulnerabilities and threat intelligence activity logs, which may come from data sources 204 as shown and described in reference to FIG. 2. Data store 506 further incudes users and account data, representing identity and account entity information for the protected information technology system. Data store 506 further includes transactional and application data, representing application and entitlement entity information for the protected information technology system.

The risk generation and normalization portion also includes a store of information regarding risks by external systems 506. This information represents known risks to information technology systems, and may include information regarding known viruses and known vulnerabilities, for example.

The risk generation and normalization portion also includes prevention engine 106 and risk engine 104. Each of prevention engine 106 and risk engine 104 may be communicatively coupled to risk normalization module 512, risk prioritization module 508, and/or threat vector store 510. Threat vector store 510 stores a list of threat vectors identified by risk engine 104 and/or prevention engine 106.

Risk normalization module 512 serves to prevent siloed risk information. Rather than providing separate risk metrics for single-sign-on related risk, multi-factor authentication related risk, privileged access related risk, Identity and access governance related risk, network, data, etc., risk normalization module helps the protected information technology system's stakeholders to make sense of the overall risk posture and assess what is really the tolerable risk level. To make sense of risk and that risk may be consumable, risk normalization module 512 provides a single risk view of the enterprise's risk posture.

Risk prioritization module 508 ranks identified risks according to any of a variety of criteria. For example, risk prioritization module 508 may rank risk according to severity of outcome. As another example, risk prioritization module 508 may rank risk according to newness of exploit. Attack trees may be ranked according to the severity of the events included in them. Other rankings are also contemplated.

The risk generation and normalization portion of cybersecurity system 500 includes risk publish/subscribe system 514. in general, a user of cybersecurity system 500 can receive reports of individual and/or ranked attack trees generated by prevention engine 106 at a user interface or by way of publish/subscribe system 514. For example, such a user may subscribe to a feed of individual attack trees as they are generated and/or in batch form.

In general, the remediation portion of cybersecurity system 500 includes remediation engine 502, which provides a user of cybersecurity system 500 with remediation options for detected threats. For example, once prevention engine 106 detects one or more attack trees, it can pass them to remediation engine 502 for reporting and/or remediation. Remediation engine 504 can present options to a user of cybersecurity system 500, e.g., through a user interface or by way of remediation publish/subscribe system 552. For example, such a user may subscribe to a feed of remediation options as they are generated and/or in batch form.

Remediation engine 502 also includes remediation connectors 554. Remediation connectors 554 operate on users (identities) and accounts 560 and transactions (e.g., entitlements) and accounts 562 in the information and technology system under protection. Remediation connectors 554 can integrate with different applications, systems, and control planes, and provide many options for remediation of potential events as detected using attack trees as disclosed herein. For example, control plane integration is shown in FIG. 5. With control plane integration, remediation engine can control elements of the system being protected to directly implement remediation actions. For example, in reference to remediation tree 404 as shown and described in reference to FIG. 4, remediation engine 500 can direct, via the control plane, the system under protection to prevent privilege escalation, represented by edge 422, and/or prevent a default administrator account from being created, as represented by node 414. Also shown in FIG. 5 is remediation by way of an incident management remediation connector. Use of the incident management remediation connector may indirectly remediate events, through the use of incident management. For example, in reference to remediation tree 404 as shown and described in reference to FIG. 4, remediation engine 500 can open a ticket in an incident management framework to have a human incident manager prevent privilege escalation, represented by edge 422, and/or prevent a default administrator account from being created, as represented by node 414. Another form of remediation connector is native remediation, such as cloud native remediation. Cloud native remediation can direct cloud-based resources to implement remediation. For example, in reference to remediation tree 404 as shown and described in reference to FIG. 4, remediation engine 500 can direct cloud-based resources to prevent a cloud-based default administrator account from being created, as represented by node 414. Although FIG. 5 depicts control plane, incident management, and cloud native remediation connectors, embodiments are not so limited. Another type of native remediation suitable for system 500 is on-premises remediation, which can direct resources present at the location of the system under protection to implement remediation actions. For example, in reference to remediation tree 404 as shown and described in reference to FIG. 4, remediation engine 500 can directly prevent privilege escalation, represented by edge 422, in an on-premises user account. Another form of remediation connector is robotic process integration. For example, in reference to remediation tree 404 as shown and described in reference to FIG. 4, remediation actions may be implemented by way of a robot, which can operate the system under protection to prevent privilege escalation, represented by edge 422, and/or change parameters to prevent a default administrator account from being created, as represented by node 414.

Remediation connectors 502 can also address risks by external systems 566. For example, remediation connectors 502 can remediate non-identity-based attacks, such as risks by internal systems 506.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A non-transitory computer readable medium comprising instructions; and at least one electronic processor that executes the instructions to configure the electronic processor as a cybersecurity system for an information and technology system, the cybersecurity system comprising:
   a risk engine that detects past events in the information and technology system, the risk engine comprising an electronically stored set of rules characterizing events;
   a prevention engine that models events in the information and technology system, the prevention engine comprising a model builder, wherein the model builder is communicatively coupled to a store of data characterizing the information and technology system and to a knowledge base of tactics, techniques, and procedures (TTPs), each TTP comprising a respective identification of an input event and a respective identification of an output event, wherein the prevention engine is communicatively coupled to the risk engine, and wherein the prevention engine comprises:
      a master communicatively coupled to, and in control of, each of a plurality of agents, each agent controlling an entity of the information and technology system; and
      a model runner communicatively coupled to the to the master, the model runner configured to direct actions of the master based on data from the model builder; and
   a user interface communicatively coupled to the risk engine and to the prevention engine;
   wherein the model builder is configured to build at least one attack tree based on a past event detected by the risk engine and a potential event modeled by the prevention engine using the knowledge base, the master, and the model runner, and wherein the cybersecurity system is configured to report the at least one attack tree through the user interface, whereby a future event depicted in the at least one attack tree can be remediated.

2. The cybersecurity system of claim 1, wherein the knowledge base of TTPs comprises TTPs constructed from natural language processing of incident reports.

3. The cybersecurity system of claim 1, wherein the model builder is configured to build the at least one attack tree based on a past event detected by the risk engine and a potential event modeled by the prevention engine by:
   receiving an identification of the past event from the risk engine;
   identifying a first TTP in the knowledge base that has a respective input event identification matching the identification of the past event; and
   determining a respective output event identification of the first TTP.

4. The cybersecurity system of claim 3, wherein the model builder is further configured to build the at least one attack tree based on a past event detected by the risk engine and a potential event modeled by the prevention engine by:
   identifying a second TTP in the knowledge base that has a respective input event identification matching the respective output event identification of first TTP; and
   determining a respective output event identification of the second TTP.

5. The cybersecurity system of claim 4, wherein the at least one the attack tree comprises:
   a first node representing the past event;
   a second node representing the respective output event of the first TTP;
   a third node representing the respective output event of the second TTP;
   a first link between the first node and the second node representing the first TTP; and
   a second link between the second node and the third node representing the second TTP.

6. The cybersecurity system of claim 5, wherein the prevention engine is further configured to execute the first TTP and the second TTP in the information and technology system.

7. The cybersecurity system of claim 6, wherein the user interface is configured to accept a user input specifying a limitation on executions of TTPs in the information and technology system by the prevention engine.

8. The cybersecurity system of claim 1, further comprising a remediation engine that provides a remediation option for preventing the future event depicted in the at least one attack tree from occurring, wherein the remediation engine is communicatively coupled to at least one of a target application, the information and technology system, or a control plane.

9. The cybersecurity system of claim 1, wherein the model builder is configured to build a plurality of attack trees based on past events detected by the risk engine and potential events modeled by the prevention engine, and wherein the cybersecurity system is configured to rank the plurality of attack trees and report the ranked plurality of attack trees through the user interface.

10. A non-transitory computer readable medium comprising instructions that, when executed by an electronic processor, configure the electronic processor as a cybersecurity system for an information and technology system, the cybersecurity system comprising:
- a risk engine that detects past events in the information and technology system, the risk engine comprising an electronically stored set of rules characterizing events;
- a prevention engine that models events in the information and technology system, the prevention engine comprising a model builder, wherein the model builder is communicatively coupled to a store of data characterizing the information and technology system and to a knowledge base of tactics, techniques, and procedures (TTPs), each TTP comprising a respective identification of an input event and a respective identification of an output event, wherein the prevention engine is communicatively coupled to the risk engine, and wherein the prevention engine comprises:
  - a master communicatively coupled to, and in control of, each of a plurality of agents, each agent controlling an entity of the information and technology system; and
  - a model runner communicatively coupled to the to the master, wherein the instructions configure the model runner to direct actions of the master based on data from the model builder; and
- a user interface communicatively coupled to the risk engine and to the prevention engine;
- wherein the instructions configure the model builder to build at least one attack tree based on a past event detected by the risk engine and a potential event modeled by the prevention engine using the knowledge base, the master, and the model runner, and wherein the instructions configure the cybersecurity system to report the at least one attack tree through the user interface, whereby a future event depicted in the at least one attack tree can be remediated.

11. The non-transitory computer readable medium of claim 10, wherein the knowledge base of TTPs comprises TTPs constructed from natural language processing of incident reports.

12. The non-transitory computer readable medium of claim 10, wherein the instructions configure the model builder to build the at least one attack tree based on a past event detected by the risk engine and a potential event modeled by the prevention engine by:
- receiving an identification of the past event from the risk engine;
- identifying a first TTP in the knowledge base that has a respective input event identification matching the identification of the past event; and
- determining a respective output event identification of the first TTP.

13. The non-transitory computer readable medium of claim 12, wherein the instructions further configure the model builder to build the at least one attack tree based on a past event detected by the risk engine and a potential event modeled by the prevention engine by:
- identifying a second TTP in the knowledge base that has a respective input event identification matching the respective output event identification of first TTP; and
- determining a respective output event identification of the second TTP.

14. The non-transitory computer readable medium of claim 13, wherein the at least one the attack tree comprises:
- a first node representing the past event;
- a second node representing the respective output event of the first TTP;
- a third node representing the respective output event of the second TTP;
- a first link between the first node and the second node representing the first TTP; and
- a second link between the second node and the third node representing the second TTP.

15. The non-transitory computer readable medium of claim 14, wherein the instructions further configure the prevention engine to execute the first TTP and the second TTP in the information and technology system.

16. The non-transitory computer readable medium of claim 15, wherein the instructions configure the user interface to accept a user input specifying a limitation on executions of TTPs in the information and technology system by the prevention engine.

17. The non-transitory computer readable medium of claim 10, wherein the cybersecurity system further comprises a remediation engine that provides a remediation option for preventing the future event depicted in the at least one attack tree from occurring, wherein the remediation engine is communicatively coupled to at least one of a target application, the information and technology system, or a control plane.

18. The non-transitory computer readable medium of claim 10, wherein the instructions configure the model builder to build a plurality of attack trees based on past events detected by the risk engine and potential events modeled by the prevention engine, and wherein the instructions configure the cybersecurity system to rank the plurality of attack trees and report the ranked plurality of attack trees through the user interface.

* * * * *